(12) United States Patent
Mittler et al.

(10) Patent No.: US 10,969,014 B2
(45) Date of Patent: Apr. 6, 2021

(54) ONE-PIECE OIL CONTROL RING

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 92 days.

(21) Appl. No.: 16/318,473

(22) PCT Filed: May 23, 2017

(86) PCT No.: PCT/EP2017/062345
§ 371 (c)(1),
(2) Date: Jan. 17, 2019

(87) PCT Pub. No.: WO2018/019445
PCT Pub. Date: Feb. 1, 2018

(65) Prior Publication Data
US 2019/0154152 A1 May 23, 2019

(30) Foreign Application Priority Data
Jul. 25, 2016 (DE) ..................... 10 2016 113 678.6

(51) Int. Cl.
*F16J 9/20* (2006.01)

(52) U.S. Cl.
CPC ..................... *F16J 9/206* (2013.01)

(58) Field of Classification Search
CPC ................. F16J 9/203; F16J 9/10; F16J 9/206
See application file for complete search history.

(56) References Cited

U.S. PATENT DOCUMENTS

| | | | | |
|---|---|---|---|---|
| 1,327,801 A * | 1/1920 | Blache | ..................... | F16J 9/062 277/543 |
| 1,832,795 A * | 11/1931 | Smith | ..................... | F16J 9/203 277/464 |
| 1,894,672 A * | 1/1933 | Deutsch | ................... | F16J 9/203 277/464 |
| 1,965,623 A * | 7/1934 | Wuerfel | ................... | F16J 9/203 277/457 |
| 1,976,794 A * | 10/1934 | McCullough | ............ | F16J 9/203 277/464 |
| 2,048,258 A * | 7/1936 | Godron | .................... | F16J 9/203 277/451 |
| 2,169,613 A * | 8/1939 | Niederlehner | .......... | F16J 9/203 277/464 |

(Continued)

FOREIGN PATENT DOCUMENTS

| | | | |
|---|---|---|---|
| DE | 211 249 C | 7/1908 | |
| EP | 0927840 A1 * | 7/1999 | ............... F16J 9/062 |

(Continued)

*Primary Examiner* — Eugene G Byrd
(74) *Attorney, Agent, or Firm* — Robert L. Stearns; Dickinson Wright, PLLC

(57) ABSTRACT

A one-piece control ring with two stripping ridges and openings that extend from the outside of the ring to the inside is provided wherein the cross section of the ring body varies in the circumferential direction. This variation is achieved with internal grooves, the cross-sectional area of which decreases in the direction of the back of the ring, and with a variation of the depth of the groove lying between the ridges.

18 Claims, 2 Drawing Sheets

(56) References Cited

U.S. PATENT DOCUMENTS

Figure 1:
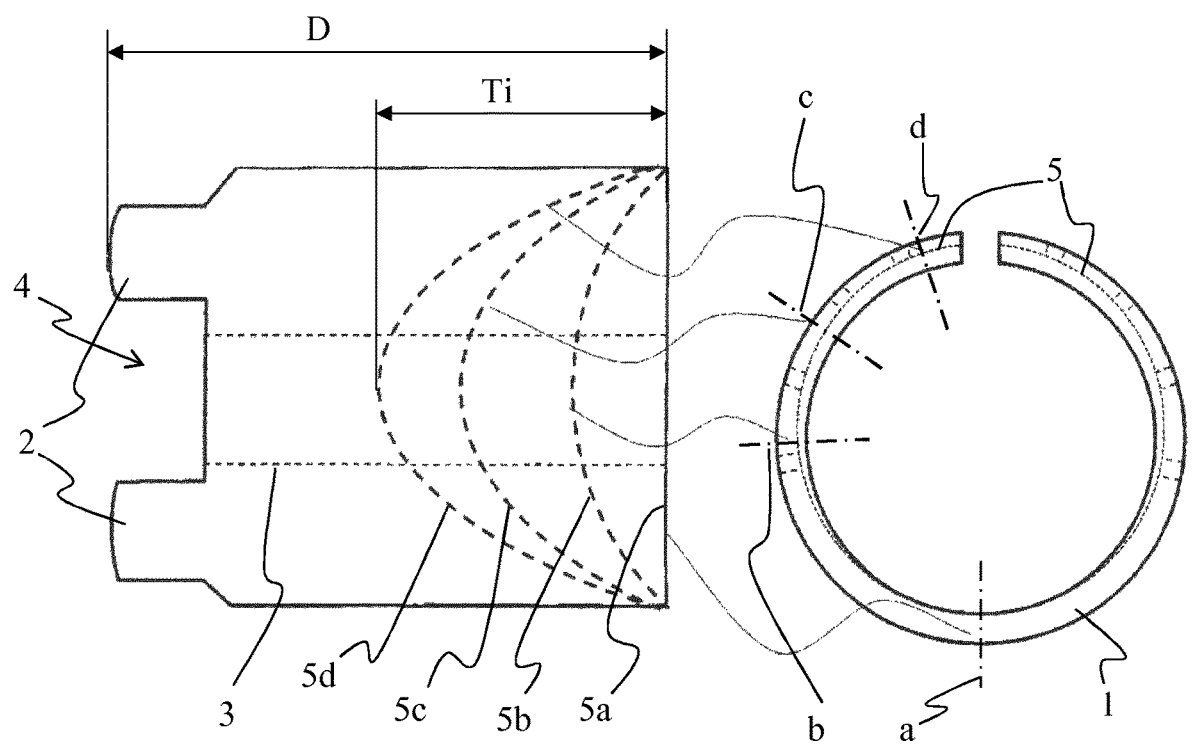

| | | | | |
|---|---|---|---|---|
| 2,213,452 | A | * | 9/1940 | Paton ........................ F16J 9/063 <br> 277/466 |
| 2,798,779 | A | * | 7/1957 | Swartz ........................ F16J 9/20 <br> 277/466 |
| 3,806,137 | A | * | 4/1974 | Prasse ........................ F16J 9/06 <br> 277/468 |
| 3,980,310 | A | * | 9/1976 | Packard .................. B23P 15/06 <br> 277/466 |
| 4,085,490 | A | * | 4/1978 | McCormick ............ B23P 15/06 <br> 148/589 |
| 4,522,412 | A | * | 6/1985 | Kubo ........................ F16J 9/062 <br> 277/443 |
| 5,752,705 | A | * | 5/1998 | Plant ........................ B21D 7/08 <br> 277/434 |
| 6,361,050 | B1 | * | 3/2002 | Sytsma ...................... F16J 9/20 <br> 277/434 |
| 10,371,086 | B2 | * | 8/2019 | Mendes de Araujo ...................... <br> F02F 3/0015 |
| 2002/0174768 | A1 | * | 11/2002 | Hitosugi .................. F16J 9/203 <br> 92/172 |
| 2006/0102131 | A1 | * | 5/2006 | Han .......................... F16J 9/12 <br> 123/193.4 |
| 2012/0205876 | A1 | * | 8/2012 | Fujimura .................. F16J 9/26 <br> 277/442 |
| 2013/0181411 | A1 | * | 7/2013 | Esser ........................ F16J 9/206 <br> 277/443 |
| 2015/0184748 | A1 | * | 7/2015 | Sytsma ...................... F16J 9/06 <br> 277/310 |
| 2015/0240943 | A1 | * | 8/2015 | Meacham ................ F16J 9/062 <br> 92/153 |

FOREIGN PATENT DOCUMENTS

| | | | |
|---|---|---|---|
| JP | 08240266 A | * 9/1996 | ............... F16J 9/14 |
| JP | 2004278378 A | 10/2004 | |
| JP | 2017116015 A | * 6/2017 | ............... F16J 9/203 |

* cited by examiner

ONE-PIECE OIL CONTROL RING

BACKGROUND

1. Technical Field

The invention pertains to piston rings, particularly to a one-piece oil control ring.

2. Related Art

One of the major problems in four-stroke engines can be seen in controlling and sealing the piston ring-piston system from and with oil present in the crankcase; this is achieved with the piston rings, which should optimally seal the combustion chamber from crankcase oil. In this context, it should be noted that a certain quantity of oil is required in the system in order to ensure the functionality of the piston ring system with respect to friction and to the seal from gas from the combustion chamber. This defined quantity of oil should be kept as small as possible, but without inhibiting the hydrodynamic lubricating film on the piston ring friction surfaces. The oil control ring particularly has to ensure a perfect equilibrium between oil omissions, functionality and wear resistance.

Oil control rings, which are also simply referred to as oil rings below, are at the present time mostly used in the form of two-piece or three-piece designs in LVD, LVP HD engines. In two-piece rings, a ring carrier is designed with an internal spring. Two ridges are arranged on the friction surface of the piston ring and strip excess oil off the cylinder wall, wherein openings, e.g. in the form of bores or slots, are located between the ridges and convey excess oil from the outside to the inside of the piston ring. The ridges are mostly designed symmetrically with respect to their height and depth, as well as with respect to their arrangement on the friction surface. The internal spring generates the forces required for pressing the outer friction surface of the piston ring, i.e. the ridges arranged on the friction surface, against the cylinder wall.

In small constructions, such a multi-piece design is associated with an elaborate manufacture, a complicated installation and the susceptibility to damages and wear. Consequently, there is a demand for an oil control ring that does not have these disadvantages and generates a pressing force against the cylinder wall, which is sufficiently uniform for fulfilling its oil control function.

SUMMARY

This is achieved by means of a one-piece oil control ring with a ring body that has a constant radial thickness in the circumferential direction, wherein two ridges, which are axially spaced apart from one another by an external groove, are circumferentially arranged on the outer friction surface of the ring body in the circumferential direction, wherein openings are arranged so as to extend radially from the bottom of the external groove to the inside of the ring body, wherein two internal grooves are arranged on the inside of the ring body and circumferentially extend in the circumferential direction, wherein one of the internal grooves respectively begins in a (respective) region of each joint end, and wherein the cross-sectional area of the internal grooves decreases from the ring joint in the direction of the back of the ring.

According to an aspect of the present invention, the openings are arranged within an angular range of 0° to 135° and of 225° to 360°, preferably of 0° to 90° and of 270° to 360°, measured from the ring joint.

According to another aspect, the depth of the internal grooves decreases from the ring joint in the direction of the back of the ring.

According to another aspect, the depth of the internal grooves amounts to zero in an angular range of 135° to 225°, preferably in an angular range of 165° to 195°, measured from the ring joint, particularly in a small angular range that essentially only includes the angle 180°.

According to another aspect, the depth of the internal grooves decreases proportionally to the angle measured from the ring joint.

According to another aspect, the beginning of the internal grooves is spaced apart from the respective joint end.

According to another aspect, the axial height of the internal grooves on the inside of the ring is smaller than the overall axial height of the ring.

According to another aspect, the axial height of the internal grooves on the inside of the ring decreases in the direction of the back of the ring starting from the ring joint.

According to another aspect, the maximum depth of the internal grooves lies in a range of 25% to 100%, preferably 50% to 100%, particularly 75% to 100%, of the axial height of the oil control ring.

According to another aspect, the depth of the external groove decreases in the direction of the back of the ring starting from the two joint ends.

According to another aspect, the depth of the external groove is constant in an angular range of 135° to 225°, preferably in an angular range of 165° to 195°, measured from the ring joint, particularly in a small angular range that essentially only includes the angle 180°.

According to another aspect, the depth of the external groove decreases proportionally to the angle measured from the ring joint.

According to another aspect, the upper and the lower half of the ring body are realized symmetrically to one another.

In accordance with conventional terminology, axial respectively refers to the corresponding direction of the piston, i.e. the direction of its reciprocating motion, or to the corresponding axis of the piston-cylinder. The ring axis is the axis that axially extends through the center of the ring and in the installed state coincides with the center axis of the piston. Accordingly, the radial direction is a direction that extends parallel to the ring plane and perpendicularly toward the ring axis or perpendicularly away from this ring axis. An axial section is a section, the plane of which contains the ring axis.

THE DRAWINGS

Figure 2A:
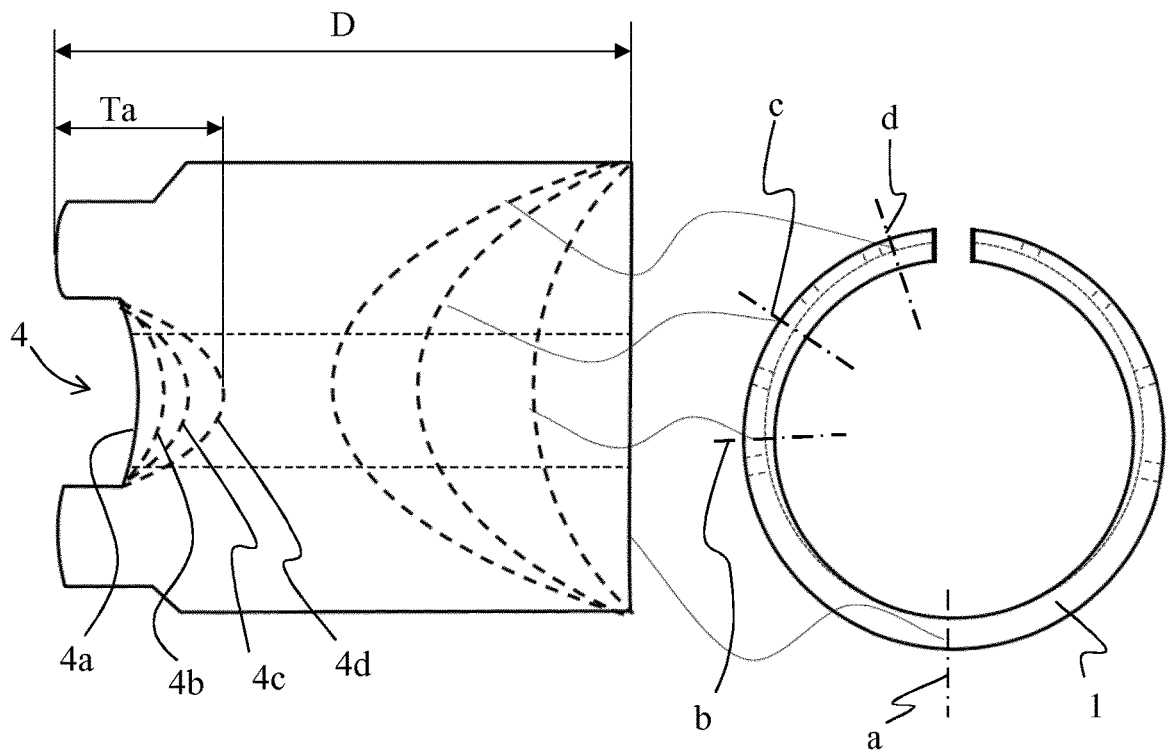
Figure 2B:
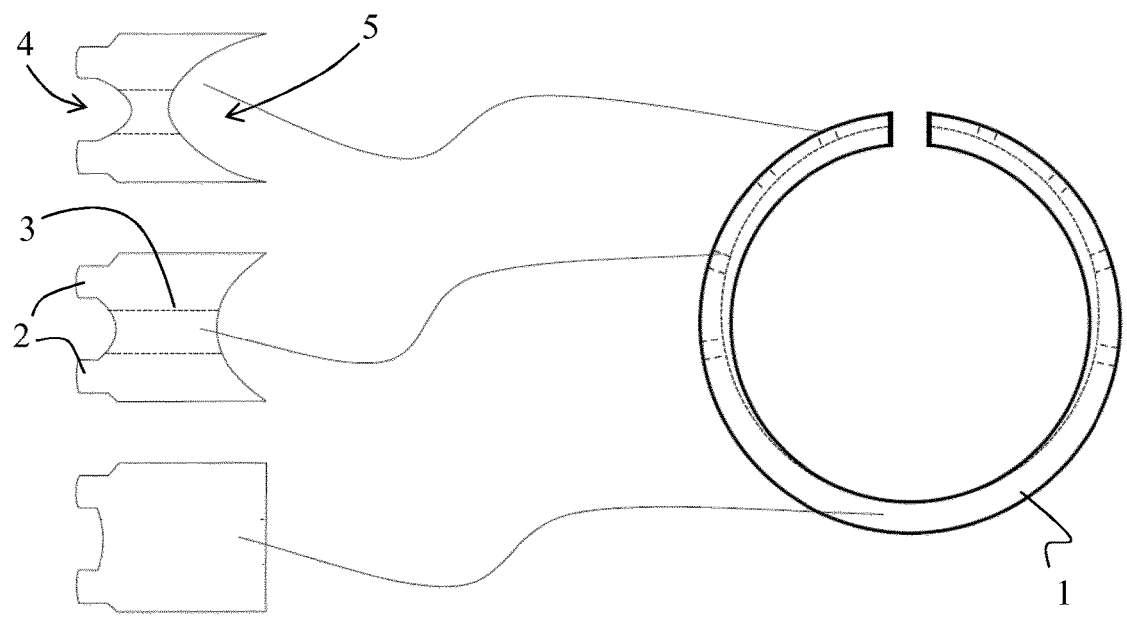

Exemplary embodiments of the invention are described in greater detail below with reference to the figures, in which FIG. 1 shows a top view and sectional representations of a first embodiment of the present invention; and FIGS. 2A and 2B show top views and sectional representations of a second embodiment.

The figures are merely intended to elucidate the basic design of the present invention, but not to restrict the scope of the invention in any way.

DETAILED DESCRIPTION

The presently described oil ring is characterized by a design without a spring, wherein the required tangential force (pressing force) is generated with a corresponding configuration. The expansion and the wall thickness of the ring are chosen such that the surface pressure corresponds to today's two-piece or three-piece oil control rings. The cross section of the ring body is correspondingly varied in the circumferential direction by means of internal grooves 5. Since the ring body has a constant radial thickness and a constant axial height in the circumferential direction, the cross-sectional area of the internal grooves is for this purpose varied in the circumferential direction, wherein the external groove of the oil control ring may be additionally varied.

FIG. 1 shows a first exemplary embodiment of the inventive oil control ring, in which the variation of the cross-sectional area is realized by varying the depth of internal grooves. The oil control ring comprises a ring body 1 that has a constant radial thickness D and height in the circumferential direction. In this case, the thickness respectively is the radial extent of the ring body in an axial section, i.e. the radially outermost or radially innermost lines/surfaces can serve as radial reference for the determination of the radial depth of the grooves.

Two ridges 2 are circumferentially arranged on the friction surface of the ring body in the circumferential direction at an axial distance from one another, wherein said ridges rest against the cylinder wall and fulfill the actual oil control function after the installation. These stripping ridges 2 extend over the entire circumference of the ring. Openings 3, e.g. in the form of bores or slots, extend radially inward through the ring body from the external friction surface region between the two ridges, i.e. from the bottom of an external groove 4 lying between the ridges. Oil accumulating between the ridges can be conveyed toward the inside of the piston ring through these openings 3 and ultimately returned into the crankcase.

Two internal grooves 5, i.e. inner grooves, are arranged on the inside of the piston ring, wherein the depth Ti of said internal grooves varies in the circumferential direction. In this context, the depth at an angular position in the circumferential direction refers to the radial distance from a radially outermost point of the groove to a radially innermost point of the surface of the inside of the piston ring in an axial section at this angular position or, in other words, to the maximum radial extent of the groove in an axial section at this angular position.

The two internal grooves 5 respectively have their greatest depth in the circumferential direction in respective regions in the vicinity of the two joint ends. In order to prevent oil from flowing directly from the internal grooves into the ring joint, the internal grooves may, if applicable, be designed such that they begin a certain distance from the joint ends, i.e. a thin ridge (with a thickness of 1 mm to a few mm on a ring with their diameter, e.g., of 80 mm or 100 mm) remains on the joint ends. The depth Ti of the internal grooves 5 decreases in the direction of the back of the ring and the grooves are no longer present in the region of the back of the ring. The cross-sectional area of the internal grooves also decreases due to the decrease of their depth Ti.

The radial wall thicknesses are therefore minimal at the joint ends and the wall thickness increases accordingly in the back of the ring. In this way, the geometrical moment of inertia in the direction of the joint ends is reduced such that a circumferentially uniform contact pressure against the cylinder wall is generated and the adaptability required for realizing the seal is achieved.

In this context, the left side of FIG. 1 shows axial sections 5a, 5b, 5c, 6d through one of the internal grooves (drawn with broken lines) at different angular positions a, b, c, d in the circumferential direction. The depth Ti of the internal grooves is only illustrated in a representative manner for the section 5d, which corresponds to the angular position d closest to the ring joint. The internal grooves are illustrated parabolic in this figure, but different shapes are also conceivable, e.g. a differently rounded shape (ellipsoidal, circular), a rectangular groove or a V-shaped groove. In the parabolic groove shown, the axial height measured at a defined radial distance from the inside of the ring decreases simultaneously with the depth and thereby likewise contributes to the decrease of the cross-sectional area. This effect also occurs, if applicable, in grooves with a different shape such a V-shape, but not with a rectangular shape.

The depth Ti of the internal grooves 5 decreases in the direction of the back of the ring starting from the ring joint. It is preferred that this decrease essentially takes place proportionally to the angle measured from the ring joint. The angular graduation is therefore chosen such that the ring joint is located at 0° and the back of the ring is located at 180°. The groove is no longer present at the back of the ring, i.e. the depth T1 of the internal grooves 5 amounts to zero at this location. At the back of the ring (which corresponds to the angular position a in FIG. 1), the inside of the ring is therefore realized without a groove in a certain angular range. This angular range without a groove may be an angular range of 135° to 225°, preferably of 165° to 195°, particularly a small angular range of no more than +/−5° that essentially only includes the angle 180°.

The depth Ti of the internal grooves 5 in the region in the vicinity of the ring joint, in which the grooves begin, i.e. the maximum depth of the internal grooves because the depth decreases in the direction of the back of the ring, should lie in a range of 25% to 100%, preferably in a range of 50% to 100%, particularly in a range of 75% to 100%, of the axial height of the oil control ring. The maximum depth of the internal grooves particularly should not exceed 100% of the axial height of the oil ring because the remaining radial ring thickness otherwise becomes excessively small and the risk of a fracture increases.

The openings 3 for the oil flow are only arranged in the regions of the smaller wall thicknesses. Measured from the ring joint, the angular range of −135° to +135°, i.e. 225° to 360° and 0° to 135°, preferably the angular range of −90° to +90°, i.e. 270° to 360° and 0° to 90°, is provided for this purpose. Due to this configuration, an oil flow in the direction of the openings is generated on the outside of the oil control ring; the internal grooves 5 lead to an additional control of the oil flow behind the ring.

Naturally, the edge of the groove does not necessarily have to coincide with the upper and lower inside edges of the ring—as illustrated in the figure. The surface of the inside of the ring may have, e.g., upper and lower regions that lie parallel to the ring axis, i.e. do not contain a groove, whereas the internal groove is merely located in a central region lying in between. If the axial height of the internal grooves at an angular position in the circumferential direction is defined as the maximum axial extent of the internal grooves in an axial section at this angular position, this axial height of the internal grooves is smaller than the overall height of the ring at least in a certain angular range. The axial height of the internal grooves preferably decreases in the direction of the back of the ring starting from the ring joint such that the cross-sectional areas of the internal grooves also decrease in the direction of the back of the ring as long as the depths of the internal grooves do not increase. It would also be conceivable to reduce the axial height of the internal grooves at the positions of the openings in order to thereby compensate the weakening of the ring body at these positions caused by the openings.

Furthermore, the upper and the lower ring half are preferably realized symmetrically to one another, i.e. mirror-symmetrically referred to a plane at half the ring height, such that no ring twist occurs during the installation of the oil control ring and the two ridges 2 are pressed against the cylinder wall with uniform surface pressure in the circumferential direction, as well as relative to one another. If the internal grooves 5 themselves are realized symmetrically, this is achieved by arranging these grooves centrally referred to the axial height of the ring body 1. Naturally, the friction surface and the openings 3 should be designed accordingly in order to prevent twisting of the ring under tension.

FIGS. 2A and 2B show a second exemplary embodiment. The preceding explanations of the internal grooves 5 with reference to FIG. 1 also apply to this embodiment. In addition, the depth Ta of the external groove 4 (which is once again only illustrated in a representative manner for 4d) also varies in the second embodiment. On the left side of FIG. 2A, this is illustrated in axial sections 4a, 4b, 4c, 4d that correspond to the angular positions a, b, c, d on the right side of the figure. In this case, the external groove 4 has its greatest depth at the two joint ends and its depth Ta circumferentially decreases in the direction of the back of the ring starting from the ring joint such that the cross section varies. However, the axial height is not varied in this case so as not to jeopardize the oil control function of the ridges 2. For the same reason, the groove walls preferably extend as perpendicular as possible to the ring axis in a radially outer region. The bottom of the external groove 4 may—similar to the bottom of the internal grooves 5—have a rounded shape (e.g. a parabolic shape as in the figures) or a polygonal shape.

The decrease of the depth Ta of the external groove 4 in the direction of the back of the ring may take place proportionally to the angle measured from the ring joint. In a region at the back of the ring, the external groove 4 may have a constant depth Ta that should be greater than zero because two stripping ridges would otherwise no longer be present at the back of the ring and the function of the oil ring would be considerably restricted. This angular range with a constant external groove depth Ta, which is measured from the ring joint, lies between 135° and 225°, preferably between 165° and 195°, particularly in a small range that essentially only includes the angle 180°.

Due to this design of the external groove 4, a purposeful oil flow in the direction of the openings 3 is ensured on the outside of the ring, wherein said openings are preferably located in a region with a smaller ring thickness, i.e. in a region in the vicinity of the ring joint, as already described above. The volumes formed by the cross-sectional area of the internal grooves 5 and the additional depth of the external groove 4 can also accommodate oil and enhance the control of the oil flow. The volume at the ring joint is increased in comparison with the volume at the back of the ring in order to thereby ensure an oil flow in the direction of the ring joint, in the vicinity of which the openings are arranged.

The left side of FIG. 2B shows three individual axial sections through the oil control ring in order to further elucidate the adaptation of the cross sections in the circumferential direction and the associated adaptation of the geometrical moment of inertia. The ring body 1 has its smallest wall thickness (and therefore the lowest geometrical moment of inertia) in the vicinity of the ring joint (top section) and its greatest wall thickness at the back of the ring. In this way, a circumferentially uniform contact pressure is achieved without an internal spring of the type used in two-piece or three-piece oil control rings. This leads to reduced wear because there is no spring-ring body contact. Furthermore, the one-piece configuration leads to a simplified installation and to a cost reduction.

The invention claimed is:

1. A one-piece oil control ring, comprising:
a ring body (1) extending circumferentially between opposing joint ends that define a ring joint;
two ridges (2), which are axially spaced apart from one another by an external groove (4), are circumferentially arranged on an outer friction surface of the ring body in the circumferential direction;
the ring body having an inner surface that includes two internal grooves (5) extending in the circumferential direction away from the joint ends and toward the back of the ring;
wherein the internal grooves (5) each have a depth that decreases from the ring joint in the direction of the back of the ring; and
wherein the ring body includes a plurality of openings (3) extending from external groove to the inner surface of the ring body and wherein the openings (3) are only arranged within an angular range of 0 to 135° and of 225° to 360° measured from the ring joint, and wherein there are no such openings outside of this range.

2. The one-piece oil control ring according to claim 1, wherein the openings (3) are arranged within an angular range of 0° to 90° and of 270° to 360° measured from the ring joint.

3. The one-piece oil control ring according to claim 1, wherein the depth (Ti) of the internal grooves (5) amounts to zero in an angular range of 135° to 225° measured from the ring joint.

4. The one-piece oil control ring according to claim 1, wherein the depth (Ti) of the internal grooves (5) decreases proportionally to the angle measured from the ring joint.

5. The one-piece oil control ring according to claim 1, wherein the beginning of the internal grooves (5) is spaced apart from the respective joint end.

6. The one-piece oil control ring according to claim 1, wherein the axial height of the internal grooves (5) on the inside of the ring is smaller than the overall axial height of the ring.

7. The one-piece oil control ring according to claim 6, wherein the internal ring grooves have an axial height on the inside of the ring that decreases in the direction of the back of the ring starting from the ring joint.

8. The one-piece oil control ring according to claim 1, wherein the maximum depth of the internal grooves (5) lies in a range of 25% to 100% of the axial height of the oil control ring.

9. The one-piece oil control ring according to claim 1, wherein the depth (Ta) of the external groove (4) decreases in the direction of the back of the ring starting from the two joint ends.

10. The one-piece oil control ring according to claim 1, wherein the depth (Ta) of the external groove (4) is constant in an angular range of 135° to 225° measured from the ring joint.

11. The one-piece oil control ring according to claim 1, wherein the depth (Ta) of the external groove (4) decreases proportionally to the angle measured from the ring joint.

12. The one-piece oil control ring according to claim 1, wherein the upper and the lower half of the ring body (1) are realized symmetrically to one another.

13. The one-piece oil control ring according to claim 1, wherein the depth of the internal grooves amounts to zero in an angular range of 165° to 195° measured from the ring joint.

14. The one-piece oil control ring according to claim 1, wherein the depth of the internal grooves amounts to zero at the angle 180°.

15. The one-piece oil control ring according to claim 1, wherein the maximum depth of the internal grooves lies in the range of 50% to 100% of the axial height of the oil control ring.

16. The one-piece oil control ring according to claim 1, wherein the maximum depth of the internal grooves lies in the range of 75% to 100% of the axial height of the oil control ring.

17. The one-piece oil control ring according to claim 1, wherein the depth of the external groove is constant in an angular range of 165° to 195° measured from the ring joint.

18. The one-piece oil control ring according to claim 1, wherein the depth of the external groove is constant measured from the ring joint at 180°.

\* \* \* \* \*